E. F. W. ALEXANDERSON.
BEARING.
APPLICATION FILED NOV. 26, 1918.
1,315,069.
Patented Sept. 2, 1919.
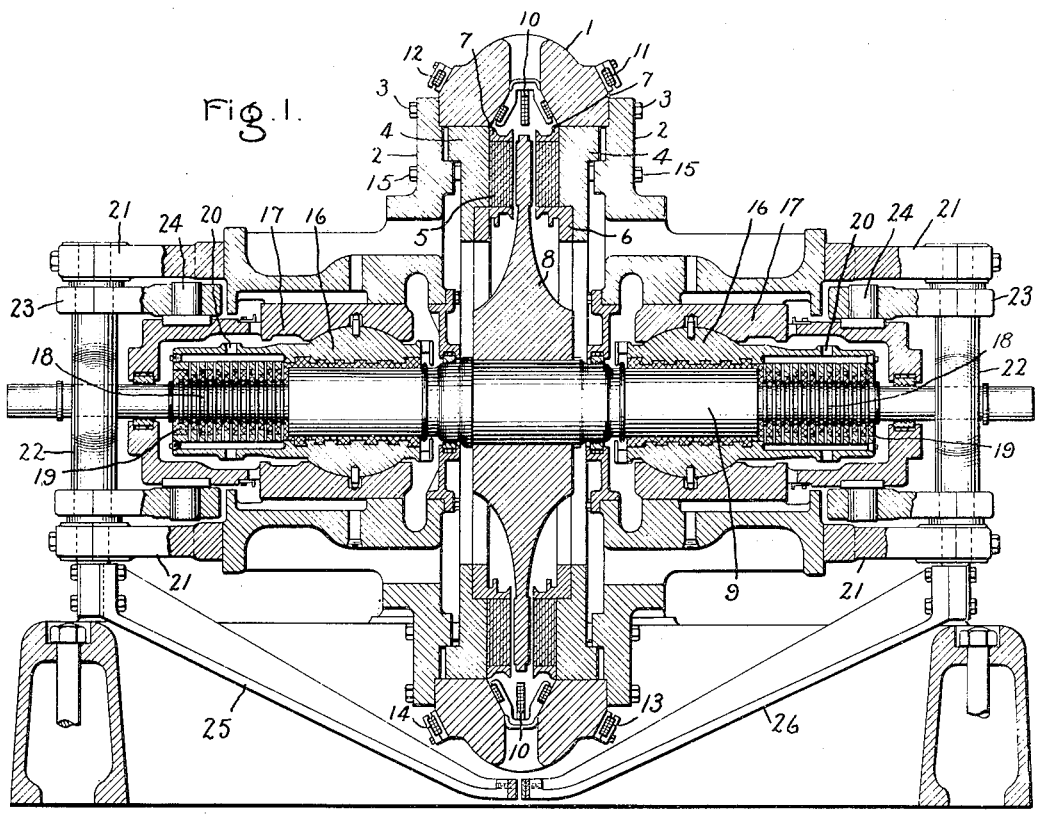
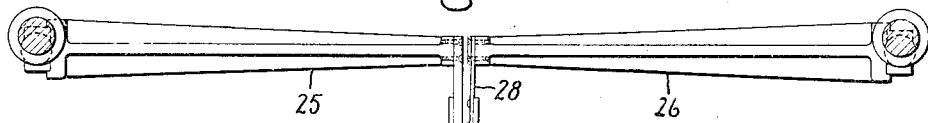
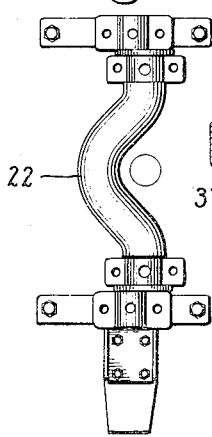
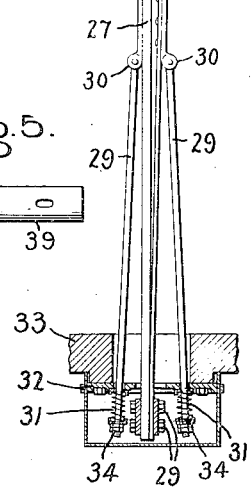
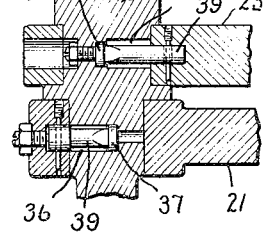
Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

BEARING.

1,315,069.   Specification of Letters Patent.   Patented Sept. 2, 1919.

Application filed November 26, 1918.   Serial No. 264,202.

*To all whom it may concern:*

Be it known that I, ERNST F. W. ALEXANDERSON, a citizen of the United States, residing at Schenectady, in the county of Schenectady, State of New York, have invented certain new and useful Improvements in Bearings, of which the following is a specification.

The present invention relates to bearings and is particularly adapted for use with high frequency alternators of the inductor type. In my prior Patent No. 1,110,030 I have described and claimed a means for equalizing the thrust upon two bearings located at opposite ends of a shaft which carries a rotor adapted to revolve at high speed. The form of bearing shown in my patent is especially adapted for small or moderate sized machines.

The object of my present invention is to provide an improved system for equalizing the thrust upon the two bearings located at opposite ends of the shaft which will be particularly adapted for use with machines of large output.

The novel features which I believe to be characteristic of my invention are set forth with particularity in the appended claims, the invention itself, however, both with respect to its organization and method of operation will best be understood by reference to the following description taken in connection with the accompanying drawing in which Figure 1 is a vertical cross-sectional view of a machine which is equipped with my invention; Fig. 2 is a plan view of the system of levers by which movement of one bearing is communicated to the other bearing; Fig. 3 is an end view of an eccentric shaft which forms part of the equalizing system; Fig. 4 is a cross-section of a portion of the eccentric shaft showing the arrangement of certain bearings on that shaft, and Fig. 5 is a detail view of one of these bearings.

The machine shown in the drawings comprising a frame 1 to which are secured the frame heads 2 by means of the bolts 3. Frame heads 2 carry end rings 4 which support circumferentially laminated core rings 5, the laminations being held in place by the clamping rings 6 and 7. The frame 1, frame heads 2 and rings 4, 5, 6 and 7 are all divided along the horizontal center line of the machine for convenience in assembling. A solid magnetic inductor 8 is mounted on the shaft 9 so that its periphery is between the opposite faces of the core rings 5. Excitation for the field of the machine is furnished by the field coil 10 which is concentric with the inductor 8 or by the coils 11, 12, 13 and 14, these coils being semi-circular in form and arranged so that each one embraces the periphery of one half of the frame 1.

The periphery of the inductor 8 is slotted on each side with approximately radial slots (not shown in the drawing) so as to form magnetic poles opposite the faces of the laminated core rings 5. In order to avoid excessive windage at the high speed at which the inductor is designed to operate the slots in the inductor periphery are filled with non-magnetic members securely fastened therein in any suitable manner. The air gaps between the inductor and the laminated core rings may be adjusted by moving end rings 4 with respect to the frame heads 2 by means of the adjusting bolts 15. The shaft 9 of the machine is carried by two bearings 16 of the self-alining type. Each of these bearings is provided with a housing 17 which is carried by the frame head 2 and which is movable with respect thereto. Portions 18 of the shaft 9 are grooved. The grooved portions 18 of the shaft are surrounded by members 19 which are grooved on their inner sides to fit the grooves in the shaft 9 so that they both support the weight of the shaft and are adapted to receive an end thrust on the shaft. Members 19 are slotted and pierced with holes to receive oil which may be supplied to the bearings through the holes 20.

The frame heads 2 carry brackets 21 which support rotatable members which in the present case take the form of eccentric shafts 22 at each end of the machine. The bearing housings 17 carry links 23 which are rotatably mounted upon the housings by means of the pins 24. Fixed to the lower ends of the eccentric shafts 22 are two lever arms 25 and 26. Lever arm 25 has rigidly secured to its free end and extending at a right angle therefrom a link 7, while lever 26 has a spring member 28 secured to its free end and extending in the same direction as the link 27. The free ends of the link 27 and the spring 28 are secured together by the bolts 29 so that a movement of one of the levers will cause a corresponding movement of the other lever through the flexible connection thus provided. Rods 29 are pivoted to link 27 and the spring 28 at 30 and the ends of these rods are surrounded by springs 31. These springs bear against a plate 32 which is secured to the bed 33 of the machine. By adjusting the bolts 34 on the ends of these rods the tension upon the springs 31 may be varied.

Any change in the pressure upon one of the bearings caused, for example, by an unbalancing of the magnetic pull on the rotor 8 or by contraction or expansion of the shaft 9 due to changes in temperature, will produce a corresponding change in the pressure upon the other bearing in the following manner: Pressure exerted upon either one of the thrust bearings is communicated to the housing 17 and through the housing to the links 23. The pressure brought to bear upon these links tends to rotate the eccentric shaft 22. This causes a movement in the lever arm attached to the shaft and a corresponding movement in the other lever arm which equalizes the pressure upon the two bearings. The springs 31 are preferably so adjusted that they will cause the levers 25 and 26 to exert equal pressures upon thrust bearings, and the pressure thus exerted should be greater than that produced by any overbalanced magnetic pull which may be set up in the machine. Under these conditions the bearings will retain certain fixed positions as long as the length of the shaft remains fixed. They will, however, move equally with any changes in the length of the shaft due to temperature changes and the inductor 8 will therefore remain fixed in its central position.

In order that the pressure upon the two bearings may be equalized under all conditions, it is desirable that friction in the link bearings should be reduced to a minimum. In order to accomplish this I have arranged the bearings on the eccentric shaft in such a way that the forces acting on these shafts are transmitted thereto only along lines which are substantially coincident with the axes of rotation of each shaft. The manner in which this is done is indicated in Figs. 4 and 5. Recesses 35 and 36 are provided in the eccentric shaft 22, and at the bottom of these recesses are provided hard steel bearing plates 37 having grooves 38 upon their faces, these grooves being substantially coincident with the axes of rotation of the shaft. Brackets 21 and the links 23 carry pins 39 having their ends rounded at 40 to form a knife edge to engage the grooves 38. Pressure between the eccentric shaft 22 and the bracket 21 and link 23 is transferred entirely from the pins 29 to the bearing plates 37 and the portions of the brackets 21 and links 23 which surround the shafts 22 serve merely as guides and supports for the pins 39.

While I have illustrated and described a single modification of my invention, I do not wish to be limited to the exact structure shown as it will be apparent that many variations may be made in the precise structure used as well as in the arrangement of the various elements without departing from the scope of the appended claims.

What I claim as new and desire to secure by Letters Patent of the United States, is:—

1. In combination, a rotatable shaft operatively mounted upon two supporting bearings, a rotor member secured to said shaft between said bearings, each of said bearings being so constructed as to normally limit longitudinal movement of the shaft, housings in which said bearings are supported, said housings being capable of longitudinal movement with the bearings under a longitudinal thrust of the shaft, rotatable members operatively connected to each of said bearings and having bearings around which they are capable of rotation, movable links each having one end attached to one of said housings and having a bearing on the other end upon a portion of one of said rotatable members, so located that movement of any one of said links will produce a rotation of the member to which it is connected, lever arms connected to each of said rotatable members and extending toward each other, and means connecting the ends of said lever arms whereby a movement of one lever arm will produce a corresponding movement of the other lever arm.

2. In combination, a rotatable shaft operatively mounted upon two supporting bearings, a rotor member secured to said shaft between said bearings, each of said bearings being so constructed as to normally limit longitudinal movement of the shaft, an eccentric shaft near each supporting bearing having fixed bearings around which it is capable of rotation, connections between said supporting bearings and said eccentric shafts whereby a movement of said supporting bearings will produce a rotation of said eccentric shafts, lever arms connected to each of said eccentric shafts and extending toward each other, and a yielding connection between the ends of said lever arms whereby a movement of one lever arm will produce a corresponding movement of the other lever arm.

3. In combination, a rotatable shaft operatively mounted upon two supporting bearings, a rotor member secured to said shaft between said bearings, each of said bearings being so constructed as to normally limit longitudinal movement of the shaft, a rotatable member near each supporting bearing having fixed bearings around which it is capable of rotation, connections between said supporting bearings and said rotatable members whereby a movement of said supporting bearings will produce a rotation of said members, lever arms connected to each of said rotatable members and extending toward each other, a yielding connection between the ends of said lever arms whereby a movement of one lever arm will produce a corresponding movement of another lever arm, and springs operatively related to the ends of said lever arms so as to produce under normal conditions equal and opposite pressures in a longitudinal direction upon the two supporting bearings.

4. In combination, a rotatable shaft operatively mounted upon two supporting bearings each of said bearings being so constructed as to normally limit longitudinal movement of the shaft, eccentric shafts located near the ends of said rotatable shaft and having fixed bearings around which they are capable of rotation, connections between said supporting bearings and said eccentric shafts whereby a movement of said supporting bearings will produce a rotation of the eccentric shafts, means whereby the forces acting between the eccentric shafts and the bearings are applied to said shafts only along lines which are substantially coincident with their two axes of rotation, lever arms connected to each of said eccentric shafts and extending toward each other and a yielding connection between the ends of said lever arms whereby a movement of one lever arm will produce a corresponding movement of the other lever arm.

5. In combination, a rotatable shaft operatively mounted upon two supporting bearings, each of said bearings being so constructed as to normally limit longitudinal movement of the shaft, eccentric shafts located near the ends of said rotatable shaft and having fixed bearings around which they are capable of rotation, connections between said supporting bearings and said eccentric shafts whereby a movement of said supporting bearings will produce a rotation of the eccentric shafts, means whereby the forces acting between the eccentric shafts and supporting bearings are applied to said shafts only along lines which are substantially coincident with their two axes of rotation, lever arms connected to each of said eccentric shafts and extending toward each other, a yielding connection between the ends of said lever arms whereby a movement of one lever arm will produce a corresponding movement of the other lever arm, and springs operatively related to the ends of said lever arms so as to produce under normal conditions equal and opposite pressures in a longitudinal direction upon the two supporting bearings.

6. The combination of a rotatable shaft operatively mounted upon two supporting bearings each of said bearings being so constructed as to normally limit longitudinal movement of the shaft, rotatable members located near the ends of said rotatable shaft, each of said rotatable members having a fixed axis of rotation and a movable axis of rotation bearings for said rotatable members comprising grooves which are substantially coincident with the axes of rotation of said members, and pins having knife edges at their ends which engage with said grooves, connections between said supporting bearings and the bearings of said rotatable members whereby a movement of said supporting bearings will produce a rotation of the rotatable members, the forces acting to produce such rotation being transferred entirely between the pins and the grooves, lever arms connected to each of said rotatable members and extending toward each other and a yielding connection between said lever arms whereby a movement of one lever arm will produce a corresponding movement of the other lever arm.

7. The combination of a rotatable member having a fixed axis of rotation and a movable axis of rotation and bearings for said member comprising recesses formed in said member, grooved bearing plates fixed in said recesses and pins having knife edges at their ends which engage the grooves in said bearing plates, the whole being so arranged that forces acting between the member and the bearings to produce rotation of the member are transferred entirely between the pins and the bearing plates.

8. The combination of an eccentric shaft having a fixed axis of rotation and a movable axis of rotation and bearings for said shaft comprising recesses formed in said shaft, grooved bearing plates fixed in said recesses, the grooves in said plates being substantially coincident with the axes of rotation of said shaft, and pins having knife edges at their ends which engage said grooves, the whole being so arranged that forces acting between the shaft and the bearings to produce rotation of the shaft are transferred entirely between the pins and the bearing plates.

9. The combination of a rotatable member having a fixed axis of rotation and a movable axis of rotation, and bearings for said member comprising grooves which are substantially coincident with the axes of rotation of said member, and pins having ends which engage said grooves, the whole being so arranged that forces acting between the member and the bearings to produce rotation of the member are transferred entirely between the pins and the grooves.

10. In combination, a rotatable shaft operatively mounted between two supporting bearings, a rotor member secured to said shaft between said bearings, each of said bearings being so constructed as to normally limit longitudinal movement of the shaft, housings in which said bearings are supported, said housings being capable of longitudinal movement with the bearings under a longitudinal thrust of the shaft, eccentric shafts operatively connected to each of said bearings and having fixed bearings around which they are capable of rotation, movable links each having one end attached to one of said housings and having a bearing on the other end around the eccentric portion of one of said eccentric shafts so that a movement of any one of said links will produce a rotation of the eccentric shaft to which it is connected, the eccentric shaft bearings being so arranged that the forces acting on the eccentric shafts are transmitted thereto only along lines which are substantially coincident with the two axes of rotation of each of said eccentric shafts, lever arms connected to each of said eccentric shafts and extending toward each other, a rigid link secured to the end of one lever arm and extending at a right angle therefrom, a spring member secured to the end of the other lever arm and extending at a right angle therefrom, the free end of said spring member being secured to the free end of said link so that a movement of one lever arm will produce a corresponding movement of the other lever arm and springs operatively related to the ends of said lever arms so as to produce under normal conditions equal and opposite pressures in a longitudinal direction upon the two supporting bearings.

11. In combination, a rotatable shaft operatively mounted upon two supporting bearings, each of said bearings being so constructed as to normally limit longitudinal movement of the shaft, rotatable members located near the ends of said shaft having two axes of rotation and having knife edge bearings around which they are capable of rotation, connections between said supporting bearings and said rotatable members whereby a movement of said supporting bearings will produce a rotation of said rotatable members, said bearings for said members being substantially coincident with their axes of rotation, lever arms connected to each of said rotatable members and extending toward each other, and a yielding connection between the ends of said lever arms whereby a movement of one lever arm will produce a corresponding movement of the other lever arm.

In witness whereof, I have hereunto set my hand this 25th day of November, 1918.

ERNST F. W. ALEXANDERSON.

Copies of this patent may be obtained for five cents each, by addressing the "Commissioner of Patents, Washington, D. C."